US007392382B1

(12) United States Patent
Weis et al.

(10) Patent No.: US 7,392,382 B1
(45) Date of Patent: Jun. 24, 2008

(54) METHOD AND APPARATUS FOR VERIFYING DATA TIMELINESS WITH TIME-BASED DERIVED CRYPTOGRAPHIC KEYS

(75) Inventors: Brian Weis, San Jose, CA (US); David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 757 days.

(21) Appl. No.: 10/420,100

(22) Filed: Apr. 21, 2003

(51) Int. Cl.
*H04L 9/00* (2006.01)
(52) U.S. Cl. .................... 713/163; 380/277; 380/44; 173/160
(58) Field of Classification Search .......... 713/163, 713/160; 380/277, 44
See application file for complete search history.

(56) References Cited

U.S. PATENT DOCUMENTS

| 6,594,758 | B1 * | 7/2003 | Okui ................. 713/163 |
| 7,181,620 | B1 * | 2/2007 | Hur ................... 713/171 |
| 2002/0085722 | A1 * | 7/2002 | Asano et al. ........... 380/278 |
| 2003/0016770 | A1 * | 1/2003 | Trans et al. ........... 375/346 |
| 2003/0208677 | A1 * | 11/2003 | Ayyagari et al. ........ 713/168 |
| 2004/0049675 | A1 * | 3/2004 | Micali et al. ........... 713/158 |
| 2005/0083947 | A1 * | 4/2005 | Vaarala et al. ........ 370/395.51 |
| 2005/0114666 | A1 * | 5/2005 | Sudia ................. 713/175 |

OTHER PUBLICATIONS

D. Estrin, et al., "Protocol Independent Multicast-Sparse Mode (PIM-SM): Protocol Specification," Jun. 1998, Network Working Group, Request for Comments: 2362, http://www.ietf.org/rfc/rfc2362.txt?number=2362, printed Jul. 21, 2003, pp. 1-62.

S. Deering, "Host Extensions for IP Multicasting," Aug. 1999, Network Working Group, Request for Comments: 1112, http://www.ietf.org/rfc/rfc1112.txt=1112, printed Jul. 21, 2003 pp. 1-16.

S. Kent, et al., "IP Encapsulating Security Payload (ESP)," Nov. 1998, Network Working Group, Request for Comments: 2406, http://www.ietf.org/rfc/rfc2406.txt?number=2406, printed Jul. 21, 2003, pp. 1-21.

C. Madson, et al., "The Use of HMSC-HAS-1-96 within ESP and AH," Nov. 1998, Network Working Group, Request for Comments: 2404, http://www.ietf.org/rfc/rfc2404.txt?number=2404, printed Jul. 21, 2003, pp. 1-7.

RSA Laboratories, "CryptoBytes," vol. 5, No. 2, Summer/Fall 2002, pp. 1-35.

U.S. Department of Commerce/National Institute of Standards and Technology, "Data Encryption Standard (DES)," Oct. 25, 1999, FIPS PUB 46-3, Federal Information, Processing Standards Publication, pp. 1-22.

(Continued)

*Primary Examiner*—Nasser Moazzami
*Assistant Examiner*—Fikremariam Yalew
(74) *Attorney, Agent, or Firm*—Hickman Palermo Truong & Becker LLP

(57) ABSTRACT

A method of verifying data timeliness with time-based derived cryptographic keys is disclosed. A master key is received. Based on both the master key and a current time, an interval key is derived. Data, which was encrypted with the interval key, is decrypted with the interval key.

28 Claims, 9 Drawing Sheets

OTHER PUBLICATIONS

Mark Baugher, et al., "Group Domain of Interpretation (GDOI), <draft-ietf-msec-gdoi-02.txt>," Jan. 7, 2002, pp. 1-28.

Neil M. Haller, "The S/KEY™ One-Time Password System," Proceedings of the Symposium on Network and Distributed Systems Security, http://www.support.psi.com/support/spart/papers/password/skey.pdf, Internet Society, Feb. 1994, pp. 151-157.

A. Perrig, et al., "Efficient Authentication and Signing of Multicast Streams over Lossy Channels," Proceedings of the IEEE Security and Privacy Symposium, http://paris.cs.berkeley.edu/~dawnsong/papers/tesla.pdf, May 2000.

A. Perrig, et al., "The TESLA Broadcast Authentication Protocol," http://www.rsasecurity.com/rsalabs/cryptobytes/cryptobytes_v5n2.pdf, RSA laboratories vol. 5, No. 2, Summer/Fall 2002.

* cited by examiner

METHOD AND APPARATUS FOR VERIFYING DATA TIMELINESS WITH TIME-BASED DERIVED CRYPTOGRAPHIC KEYS

FIELD OF THE INVENTION

The present invention generally relates to computer network security. The invention relates more specifically to a method and apparatus for verifying data timeliness with time-based derived cryptographic keys.

BACKGROUND OF THE INVENTION

The approaches described in this section could be pursued, but are not necessarily approaches that previously have been conceived or pursued. Therefore, unless otherwise indicated herein, the approaches described in this section are not prior art to the claims in this application and are not admitted to be prior art by inclusion in this section.

In an Internet Protocol (IP) multicast group, one group member host can multicast data packets over a computer network to multiple other group member hosts. Each of the other group member hosts receives data packets that have been multicasted to the group address. Data packets may be multicasted to a group according to a multicasting routing protocol such as Protocol Independent Multicast (PIM). PIM is described in the Internet Engineering Task Force (IETF) Request For Comments (RFC) 2362.

A host may join a group through a mechanism provided by an admission control protocol such as Internet Group Management Protocol (IGMP). IGMP is described in IETF RFC 1112. Once a host has joined a group as a group member, the host receives all messages that are multicasted to the group address. Unfortunately, current multicasting routing protocols and admission control protocols do not require that hosts are authorized prior to joining an IP multicast group. As a result, a rogue host can join a group unchallenged, multicast data packets to the group, and receive data packets that have been multicasted to the group.

To prevent rogue hosts from understanding confidential data that has been multicasted to a group, group members may encrypt data prior to multicasting the data to the group. Group members may encrypt data using a symmetric-key encryption algorithm such as that specified by Data Encryption Standard (DES). DES is described in Federal Information Processing Standards Publication (FIPS PUB) 44-2. Data encrypted with a symmetric-key encryption algorithm can only be decrypted with the same key that was used to encrypt the data.

Thus, even though a rogue host may intercept encrypted data that has been multicasted to a group, the rogue host cannot decrypt the encrypted data without the key, which is distributed only to legitimate group member hosts through secure means. Additionally, because rogue hosts lack the key, rogue hosts are unable to encrypt data using the key. Consequently, legitimate group member hosts can identify, as potentially being the forgery of a rogue host, data that has not been encrypted with the key.

Unfortunately, even in an environment in which such encryption is implemented, a rogue host still can perpetrate attacks on legitimate group member hosts by re-multicasting, or "replaying" legitimately encrypted data packets that the rogue host intercepted. Because the data packets are encrypted with the key, legitimate group member hosts are unable to determine that the data packets have been replayed. As a result, legitimate group members accept the replayed data packets as being legitimate and timely.

By replaying data packets, a rogue host can perpetrate attacks that may cause multiple adverse effects. By replaying data packets in massive amounts, a rogue host can overwhelm legitimate group member hosts so as to prevent most, if not all, legitimate data packets from being received by the legitimate group member hosts. Such an attack is called a "denial of service" attack. Furthermore, replayed data packets may contain time-dependent information, such as a stock quote, which is correct only for a relatively short interval of time. Legitimate group member hosts are oblivious to the untimeliness of the information, and, in their ignorance, may allow the "stale" information to be used by applications and/or users as though the information was "fresh," with potentially disastrous results.

Various approaches could be used in an effort to protect against replayed data packets. According to one approach, a sender host adds a different sequence number to each data packet that the sender host will send. A data packet's sequence number indicates the data packet's proper order relative to other data packets sent by a particular host. While two or more different hosts may send different data packets that contain the same sequence number, no host adds the same sequence number to more than one data packet that the host will send. Therefore, if a recipient host receives a data packet that contains a sequence number that was contained in another data packet previously received from the same sender host, then the recipient host may presume that the data packet has been replayed.

Under this approach, a sequence number added to a data packet by a host has no relation to another sequence number added to another data packet by another host. Therefore, under this approach, each recipient host is required to maintain separate sequence number state information for each different sender host. In an environment characterized by a very large number of sender hosts, maintaining separate sequence number state information for each and every sender host can consume a prohibitive amount of storage space. This issue is acute when receivers are packet routers that have limited storage. From a practical standpoint, the sequence number approach is not scalable.

According to another approach, a timestamp is added to each data packet. The timestamp reflects the time of day at which the data packet was sent. By comparing the current time of day to the time of day indicated by the timestamp, a recipient host can determine whether a data packet containing the timestamp is fresh or stale.

However, if a recipient host's clock differs from the sender host's clock, the recipient host may determine, mistakenly, that a data packet is stale when, actually, the data packet is fresh, or that a data packet is fresh when, actually, the data packet is stale. Thus, to be effective, hosts in environments that rely upon timestamps to protect against packet replay are required to have tightly synchronized internal clocks. Network Time Protocol (NTP), described in IETF RFC 1305, may be used to synchronize the times of day of multiple hosts. Typically, absolute inter-host time synchronization involves significant communications overhead, which increases as the number of hosts increases. From a practical standpoint, the timestamp approach is not scalable.

Additionally, some of the most widely used data security protocols, such as IP Security Protocol (IPsec) Encapsulating Security Payload (ESP), do not provide a standard mechanism for the inclusion of a timestamp within a data packet. ESP is described in IETF RFC 2406. Adapting existing systems that currently use such data security protocols to cause data packets to contain timestamps in a standard format would be a potentially expensive and time-consuming task.

Based on the foregoing, there is a clear need for a method of verifying data timeliness in a multiple-sender environment without requiring recipients to maintain separate state information for each sender, without requiring senders and recipients to maintain tightly synchronized time, while also allowing hosts to continue to use existing data security protocols that do not provide a standard mechanism for adding timestamps to data packets.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
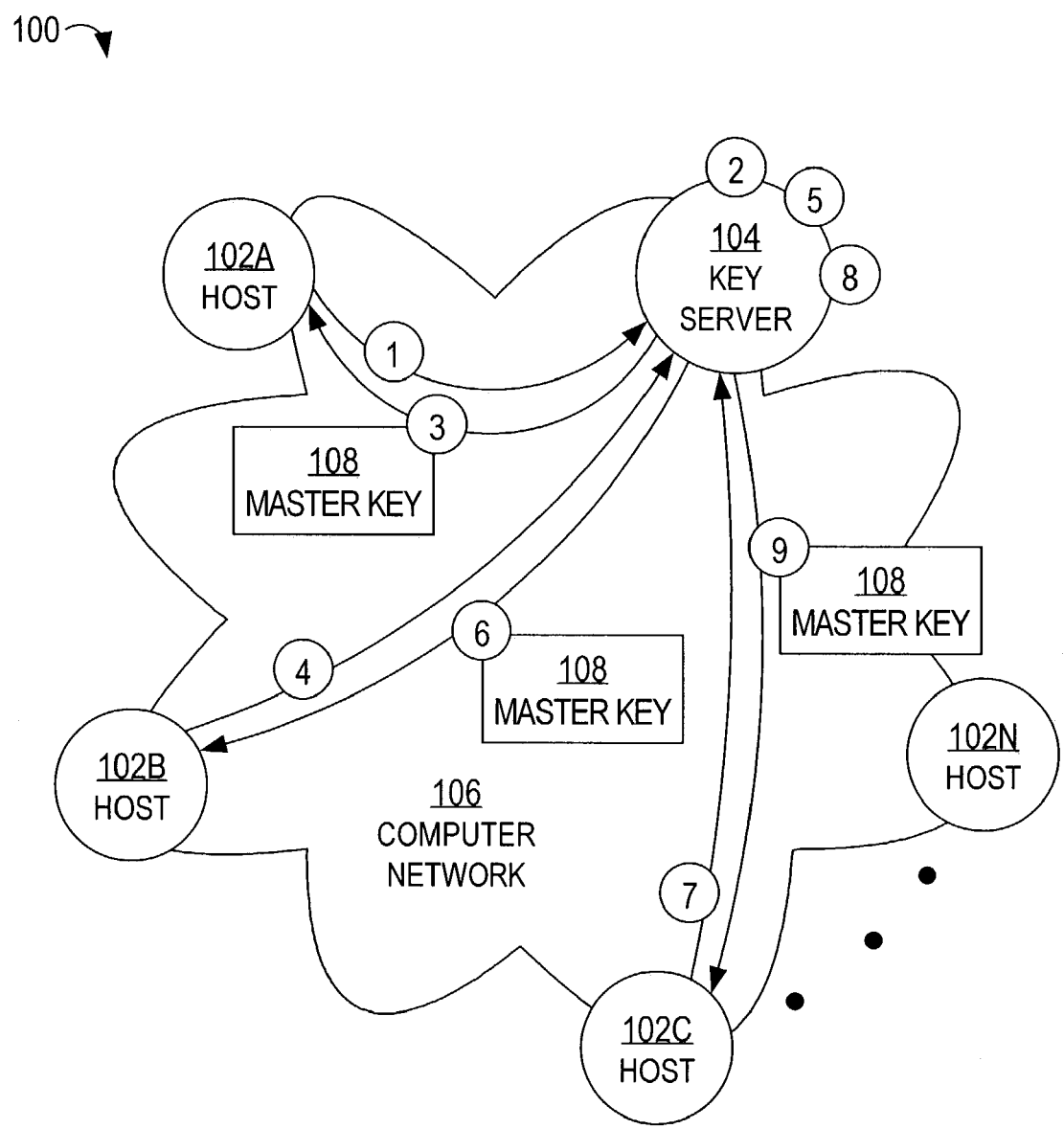
FIGS. 1A, 1B, 1C, and 1D are block diagrams that illustrate an overview of an example system that may be used to practice a method of verifying data timeliness with time-based derived cryptographic keys.
Figure 1B:
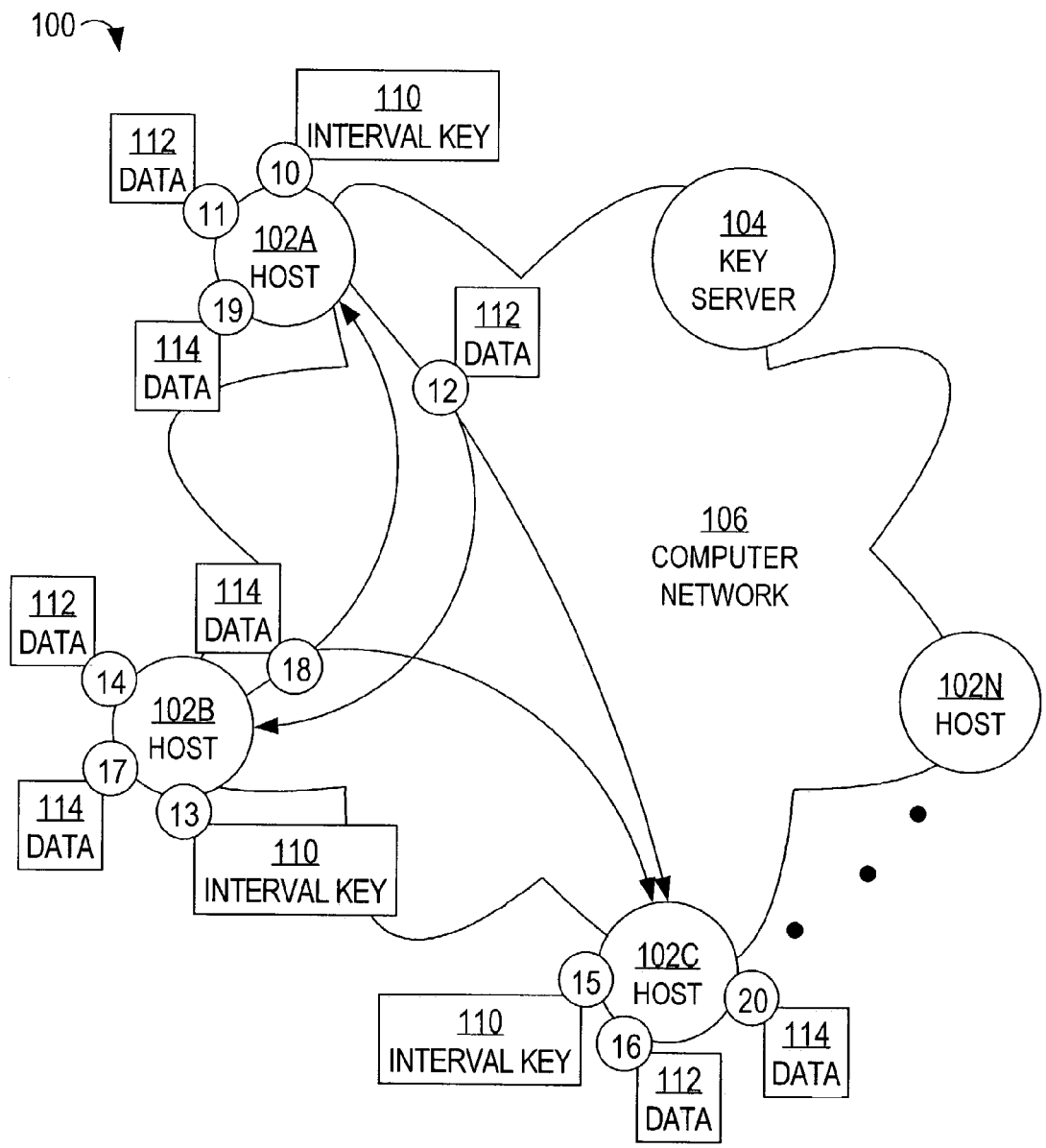
Figure 1C:
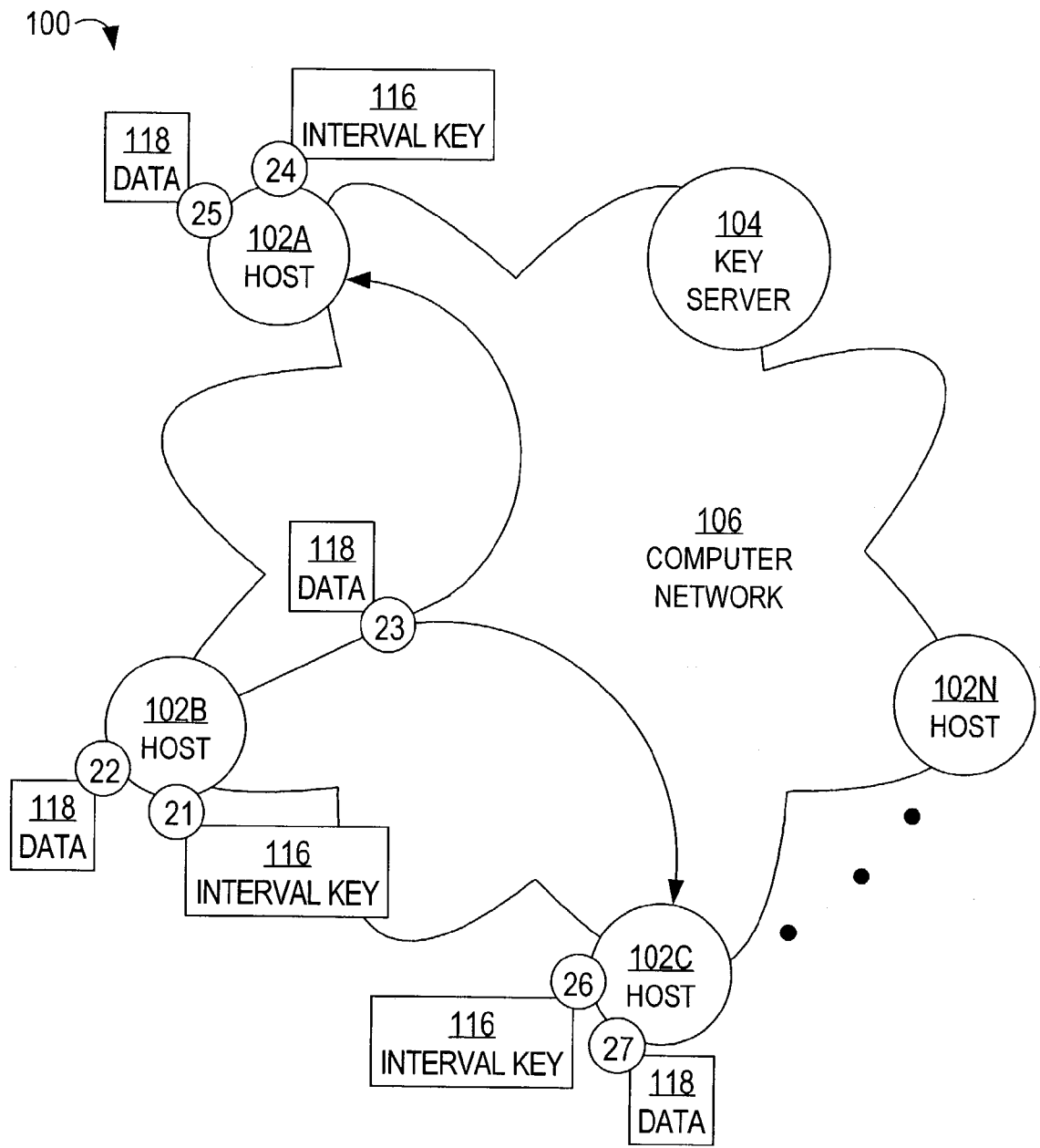
Figure 1D:
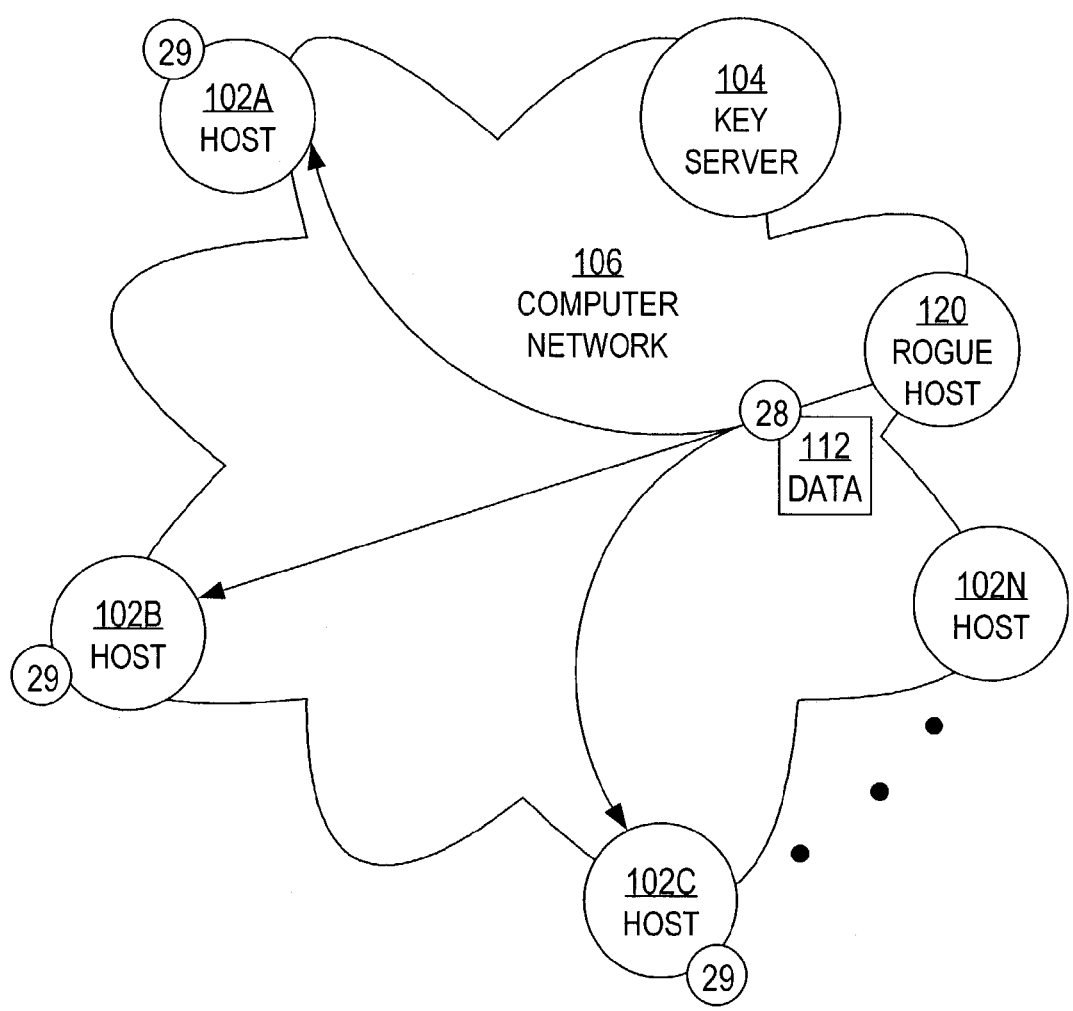

A method and apparatus for verifying data timeliness with time-based derived cryptographic keys is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Verifying Data Timeliness With Time-based Derived Cryptographic Keys
4.0 Implementation Mechanisms—Hardware Overview
5.0 Extensions and Alternatives 1.0 General Overview The needs identified in the foregoing Background, and other needs and objects that will become apparent from the following description, are achieved in the present invention, which comprises, in one aspect, a method of verifying data timeliness with time-based derived cryptographic keys. According to one aspect of the method, a master key is received. Based on both the master key and a current time, an interval key is derived. Data, which was encrypted with the interval key, is decrypted with the interval key.

For example, a host in a network of hosts may join a group, such as a multicast group, by registering with a key server. The key server may authenticate the host, verify that the host is authorized to become a member of the group, and, using a secure communications protocol, send a master cryptographic key to the host. The key server may also send an identity of a current time interval, such as a number that corresponds to the current time interval and distinguishes the current time interval from past and future time intervals. The identity does not need to be a timestamp. The key server may also send an indication of an amount of time-remaining in the current time interval. Each time interval is of a specified duration; for example, 3 seconds.

Based on the current time interval's identity and the master key, a group member host derives an interval key that corresponds to the current time interval. A group member host can derive the interval key by applying a one-way function to a combination, such as a concatenation, of the current time interval's identity and the master key. Because each group member host knows the same one-way function, the same current time interval, and the same master key, each group member host can derive the same interval key. Each group member host knows the length of each time interval, and how much time remains in the current time interval. Therefore, each group member host can determine when to transition to the next time interval. Even though a different interval key is derived for each different time interval, all of the group member hosts can derive the same interval key for a given time interval. Hosts that are not group members do not know the master key, and therefore cannot derive any interval keys.

When a particular group member host needs to send data to other group member hosts, the particular group member host can encrypt the data with the current interval key prior to sending the data. When a host receives a data packet that contains encrypted data, the host can attempt to decrypt the encrypted data with an interval key. If the host can decrypt the data with the interval key, then the host is assured that the data was fresh as of the time interval that corresponds to the interval key. Data encrypted with a particular interval key can only be decrypted with the same particular interval key. No single interval key corresponds to more than one time interval. If the host cannot decrypt the data with the interval key, then the host knows that the data was not fresh as of the time interval that corresponds to the interval key; the host knows that the data has been replayed.

A host may store and use interval keys that correspond to time intervals previous to a current time interval, thereby permitting the decryption of data that might have been in transit at the time that a transition between time intervals occurred. By refusing to decrypt data with an interval key that is older than a specified age, a host can prevent stale data from being represented as fresh data. As the specified age is made shorter, the tolerance for stale data is decreased.

Unlike some prior approaches to protecting against replayed data packets, techniques disclosed herein do not require group member hosts to store separate state information for each other group member host. Each group member host uses the same interval key to encrypt and decrypt data during the time interval that corresponds to the interval key, making the storage of separate state information unnecessary.

According to techniques disclosed herein, tight time synchronization between group member hosts is unnecessary. The time interval values do not need to represent the same absolute time of day. Thus, unlike any prior approaches to protecting against replayed data packets, techniques described herein are scalable to environments in which there are a very large number of hosts in a group. Also unlike some prior approaches to protecting against replayed data packets, techniques disclosed herein may be used in conjunction with widely used data security protocols, such as IPsec ESP, that do not provide a standard mechanism for representing timestamps.

In other aspects, the invention encompasses a computer apparatus and a computer-readable medium configured to carry out the foregoing steps.

2.0 Structural and Functional Overview

FIGS. 1A, 1B, 1C, and 1D are block diagrams that illustrate an overview of an example system that may be used to practice a method of verifying data timeliness with time-based derived cryptographic keys. A system 100 comprises hosts 102A-102N. For example, hosts 102A-102N may be computers, processes, applications, agents, etc. In one embodiment, each of hosts 102A-102N is an IP telephone. System 100 further comprises a key server 104. Key server 104 operates according to a group key management protocol, such as Group Domain of Interpretation (GDOI). In one embodiment, key server 104 is a GDOI key server.

Each of hosts 102A-102N is coupled communicatively with each other of hosts 102A-102N through a computer network 106. Each of hosts 102A-102N is coupled communicatively with key server 104 through computer network 106. Computer network 106 may be a local area network (LAN), a wide area network (WAN), one or more inter-networks, etc. The system shown is just one of many possible different configurations. Other embodiments may include fewer or more system components than those illustrated.

Through computer network 106, hosts 102A-102N may obtain a master key from key server 104. After obtaining the master key, hosts 102A-102N can derive interval keys, encrypt and decrypt data with the interval keys, and multicast interval key-encrypted information to each other through computer network 106. While multicasting is discussed herein as a group communication mechanism, group communication may also be achieved through mechanisms other than multicasting, such as broadcasting, anycasting, or unicasting. Embodiments are not limited to multicasted communications. The order of an example of hosts 102A-102C operating in this manner is denoted in FIG. 1A by circumscribed numerals 1-9, in FIG. 1B by circumscribed numerals 10-20, in FIG. 1C by circumscribed numerals 21-27, and in FIG. 1D by circumscribed numerals 28-29.

At circumscribed numeral 1, host 102A registers with key server 104 according to a group key management protocol. At circumscribed numeral 2, in response to host 102A registering with key server 104, key server 104 authenticates host 102A, and verifies that host 102A is authorized to join a particular group. At circumscribed numeral 3, after authenticating host 102A and verifying that host 102A is authorized to join the particular group, key server 104 sends a master key 108 to host 102A according to a secure communications protocol. Key server 104 also sends, to host 102A, an identity of a current time interval, such as a time of day at which the current time interval began, or a number that corresponds to the current time interval and distinguishes the current time interval from past and future time intervals. Key server 104 also sends, to host 102A, an indication of an amount of time remaining in the current time interval.

At circumscribed numerals 4-6, host 102B and key server 104 perform the same operations in relation to each other as host 102A and key server 104 performed in relation to each other at circumscribed numerals 1-3. At circumscribed numerals 7-9, host 102C and key server 104 perform the same operations in relation to each other as host 102A and key server 104 performed in relation to each other at circumscribed numerals 1-3. Therefore, after circumscribed numeral 9, each of hosts 102A-102C has joined the particular group, knows master key 108, knows the current time interval, and knows how much time remains in the current time interval.

At circumscribed numeral 10, during a first time interval, host 102A derives an interval key 110 based on master key 108 and the first time interval's identity, e.g., "1". At circumscribed numeral 11, host 102A encrypts data 112 with interval key 110. At circumscribed numeral 12, host 102A multicasts encrypted data 112 to hosts 102B and 102C.

At circumscribed numeral 13, also during the first time interval, host 102B derives interval key 110 based on master key 108 and the first time interval's identity. At circumscribed numeral 14, host 102B decrypts encrypted data 112 with interval key 110. Thus, host 102B is assured that data 112 was encrypted during the first time interval. Therefore, host 102B is assured that data 112 is not replayed data that was originally multicasted during a previous time interval.

Similarly, at circumscribed numeral 15, also during the first time interval, host 102C derives interval key 110 based on master key 108 and the first time interval's identity. At circumscribed numeral 16, host 102C decrypts encrypted data 112 with interval key 110. Thus, host 102C is assured that data 112 was encrypted during the first time interval. Therefore, host 102C is assured that data 112 is not replayed data that was originally multicasted during a previous time interval.

At circumscribed numeral 17, also during the first time interval, host 102B encrypts data 114 with interval key 110. At circumscribed numeral 18, host 102B multicasts encrypted data 114 to hosts 102A and 102C.

At circumscribed numeral 19, host 102A decrypts encrypted data 114 with interval key 110. Thus, host 102A is assured that data 114 was encrypted during the first time interval. Therefore, host 102A is assured that data 114 is not replayed data that was originally multicasted during a previous time interval.

Similarly, at circumscribed numeral 20, host 102C decrypts encrypted data 114 with interval key 110. Thus, host 102C is assured that data 114 was encrypted during the first time interval. Therefore, host 102C is assured that data 114 is not replayed data that was originally multicasted during a previous time interval.

At circumscribed numeral 21, during a second time interval, host 102B derives an interval key 116 based on master key 108 and the second time interval's identity, e.g., "2". Interval key 116 differs from interval key 110. At circumscribed numeral 22, host 102B encrypts data 118 with interval key 116. At circumscribed numeral 23, host 102B multicasts the encrypted data 118 to hosts 102A and 102C.

At circumscribed numeral 24, also during the second time interval, host 102A derives interval key 116 based on master key 108 and the second time interval's identity. At circumscribed numeral 25, host 102A decrypts encrypted data 118 with interval key 116. Thus, host 102A is assured that data 118 was encrypted during the second time interval. Therefore, host 102A is assured that data 118 is not replayed data that was originally multicasted during a previous time interval.

Similarly, at circumscribed numeral 26, also during the second time interval, host 102C derives interval key 116 based on master key 108 and the second time interval's identity. At circumscribed numeral 27, host 102C decrypts encrypted data 118 with interval key 116. Thus, host 102C is assured that data 118 was encrypted during the second time interval. Therefore, host 102C is assured that data 118 is not replayed data that was originally multicasted during a previous time interval.

Because each of hosts 102A-102C derives interval key 110 based on the first time interval's identity and master key 108, and because each of hosts 102A-102C derives interval key 110 based on the second time interval's identity and master key 108, none of hosts 102A-102C needs to store separate state information for each of the others of the hosts. It is sufficient for each of hosts 102A-102C to store the identity of the current time interval and the master key, which are consistent throughout the particular group.

At circumscribed numeral 28, during a third time interval, a rogue host 120, which is also coupled communicatively to computer network 106, attempts to mount an attack on the group comprising hosts 102A-102C by re-multicasting now-stale data 112 to hosts 102A-102C. Rogue host 120 acquired data 112 in encrypted form during the first time interval by listening to network traffic on computer network 106. Because rogue host 120 does not have master key 108, rogue host 120 cannot derive interval key 110, with which data 112 was encrypted.

At circumscribed numerals 29, also during the third time interval, hosts 102A-102C attempt to decrypt data 112 with any interval keys that remain valid during the third time interval. In this example, interval key 110, which remained valid at least during the first time interval, has expired by the third time interval. Therefore, none of hosts 102A-102C can decrypt data 112 during the third time interval. As a result, each of hosts 102A-102C determines that data 112 is stale. The attack mounted by rogue host 120 fails.

While, in one embodiment, each interval key is derived based on an absolute time of day at which the interval key's corresponding time interval started, in an alternative embodiment, each interval key is derived based on a counter that indicates how many time intervals of a specified duration of time have passed relative to the occurrence of a specified event, such as the end of a key negotiation period. Thus, in one embodiment, a time interval's identity is the absolute time of day at which the time interval started, while in an alternative embodiment, a time interval's identity is a number that distinguishes the time interval from other time intervals. At the end of each time interval, each of hosts 102A-102C may increment a counter that identifies the current time interval. Because timestamps do not need to be included in multicasted data packets, there is no need for absolute time synchronization between hosts, and hosts 102A-102C can use data security protocols that do not provide a standard mechanism for representing timestamps, such as IPsec ESP.

According to one embodiment, key server 104 periodically sends synchronization messages to each group member host. Such synchronization messages may indicate the identity of the current time interval relative to past and future time intervals, and how much time remains in the current time interval. Based on these messages, group member hosts may update counters that identify the current time interval, so that all group members agree upon the current time interval.

Figure 2:
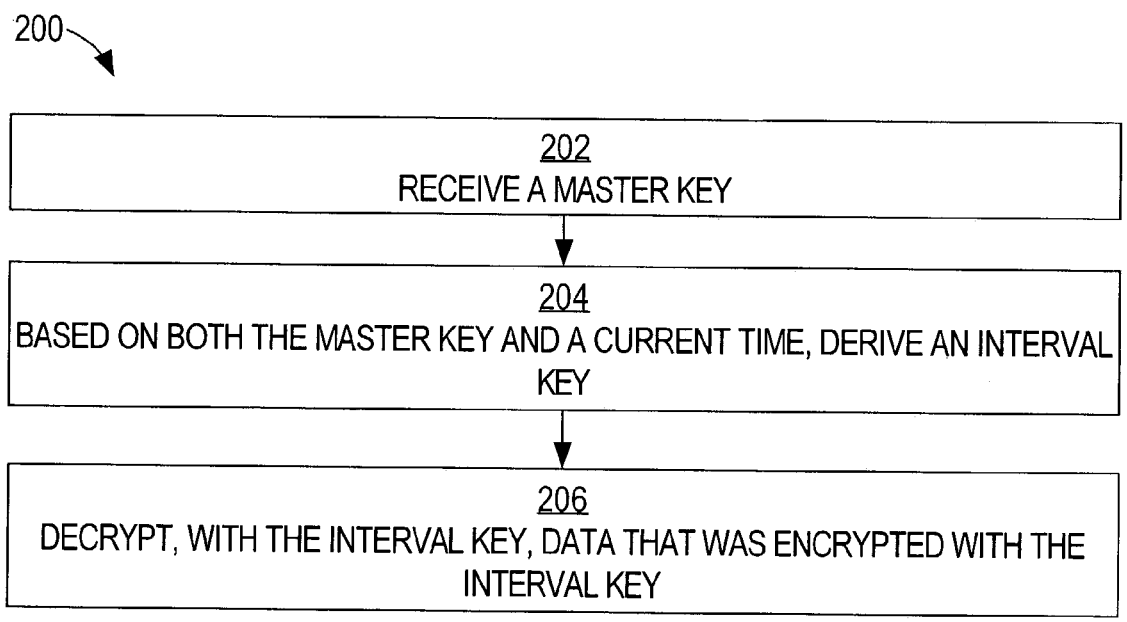
FIG. 2 is a flow diagram that illustrates a high level overview of one embodiment of a method of verifying data timeliness with a time-based derived cryptographic key.

3.0 Method of Verifying Data Timeliness with Time-Based Derived Cryptographic Keys FIG. 2 is a flow diagram that illustrates a high level overview of one embodiment of a method 200 of verifying data timeliness with a time-based derived cryptographic key. Such a method may be performed by any of many different devices, such as, for example, any of hosts 102A-102N described above.

In block 202, a master key is received. For example, host 102C may receive master key 108 from key server 104, as described above with reference to circumscribed numeral 9 of FIG. 1A.

In block 204, an interval key is derived based on both the master key and a current time. For example, host 102C may derive interval key 110 based on both master key 108 and a current time interval's identity, as described above with reference to circumscribed numeral 15 of FIG. 1B. Host 102C may derive interval key 110 by determining a value of a one-way, pseudorandom, cryptographic function applied to a combination of master key 108 and the current time interval's identity. The interval key may be derived based on other data in addition to the master key and the current time interval's identity.

In block 206, data that was encrypted with the interval key is decrypted with the interval key. For example, with interval key 110, host 102C may decrypt data 112, as described above with reference to circumscribed numeral 16 of FIG. 1B. Data may be encrypted and decrypted, for example, according to a symmetric-key encryption algorithm such as DES.

As a result of method 200, a group member host can verify the timeliness, or freshness, of data, without needing to store separate state information for each other group member host in a group.

Figure 3:
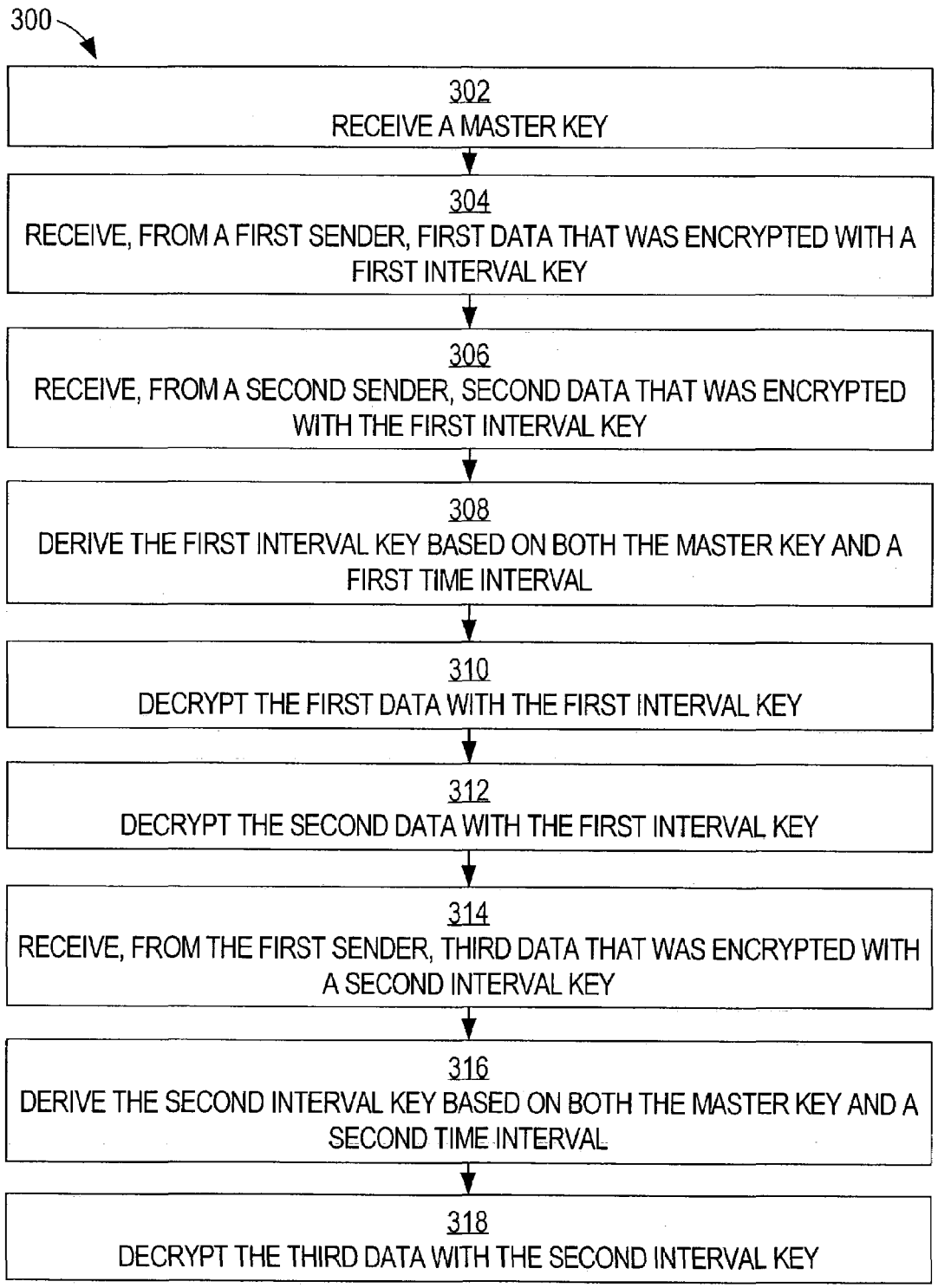
FIG. 3 is a flow diagram that illustrates one embodiment of a method of verifying data timeliness with time-based derived cryptographic keys.

FIG. 3 is a flow diagram that illustrates one embodiment of a method 300 of verifying data timeliness with time-based derived cryptographic keys. Such a method may be performed by any of many different devices, such as, for example, any of hosts 102A-102N described above.

In block 302, a master key is received. For example, host 102C may receive master key 108 from key server 104, as described above with reference to circumscribed numeral 9 of FIG. 1A.

In block 304, first data, which was encrypted with a first interval key, is received from a first sender. For example, host 102C may receive, from host 102B, data 114 that host 102B encrypted with interval key 110, as described above with reference to circumscribed numeral 18 of FIG. 1B.

In block 306, second data, which was encrypted with the first interval key, is received from a second sender that differs from the first sender. For example, host 102C may receive, from host 102A, data 112 that host 102A encrypted with interval key 110, as described above with reference to circumscribed numeral 12 of FIG. 1B.

In block 308, the first interval key is derived based on both the master key and a first time interval. For example, host 102C may derive interval key 110 based on both master key 108 and a first time interval's identity, as described above with reference to circumscribed numeral 15 of FIG. 1B. Host 102C may derive interval key 110 by determining a value of a one-way function applied to a combination of master key 108 and the first time interval's identity.

In block 310, the first data is decrypted with the first interval key. For example, with interval key 110, host 102C may decrypt data 114, as described above with reference to circumscribed numeral 20 of FIG. 1B.

In block 312, the second data is decrypted with the first interval key. For example, with interval key 110, host 102C may decrypt data 112, as described above with reference to circumscribed numeral 16 of FIG. 1B.

Thus, according to one embodiment, different data items encrypted during the same time interval are decrypted with the same interval key, regardless of the host that sent the data items. Therefore, unlike the sequence number approach described above, group member hosts do not need to store separate sequence number state information for each other. As a result, method 300 is scalable, unlike the sequence number approach described above.

In block 314, third data, which was encrypted with a second interval key that differs from the first interval key, is received from the first sender. For example, host 102C may receive, from host 102B, data 118 that host 102B encrypted with interval key 116, as described above with reference to circumscribed numeral 23 of FIG. 1C.

In block 316, the second interval key is derived based on both the master key and a second time interval that differs from the first time interval. For example, host 102C may derive interval key 116 based on both master key 108 and a second time interval's identity, as described above with reference to circumscribed numeral 26 of FIG. 1C. Host 102C may derive interval key 116 by determining a value of the same one-way function applied to a combination of master key 108 and the second time interval's identity. Due to the difference between the first time interval's identity and the second time interval's identity, the value of the one-way function differs, when applied to a combination that contains the first time interval's identity, from the value of the one-way function when applied to a combination that contains the second time interval's identity.

In block 318, the third data is decrypted with the second interval key. For example, with interval key 116, host 102C may decrypt data 118, as described above with reference to circumscribed numeral 27 of FIG. 1B.

Thus, data encrypted during different time intervals are decrypted with different interval keys, thereby enabling group member hosts to determine whether purportedly fresh data is actually stale. Data that is to be multicasted or otherwise communicated to a group of recipients during a particular interval of time is encrypted with a particular interval key that corresponds to the particular interval of time. For example, data that is to be multicasted during a first time interval is encrypted with a first interval key, and data that is to be multicasted during a second time interval is encrypted with a second interval key. According to one embodiment, interval keys that are older than a specified age are deleted from a group member host's storage so that the group member host cannot continue to use the old interval keys to decrypt data.

Figure 4A:
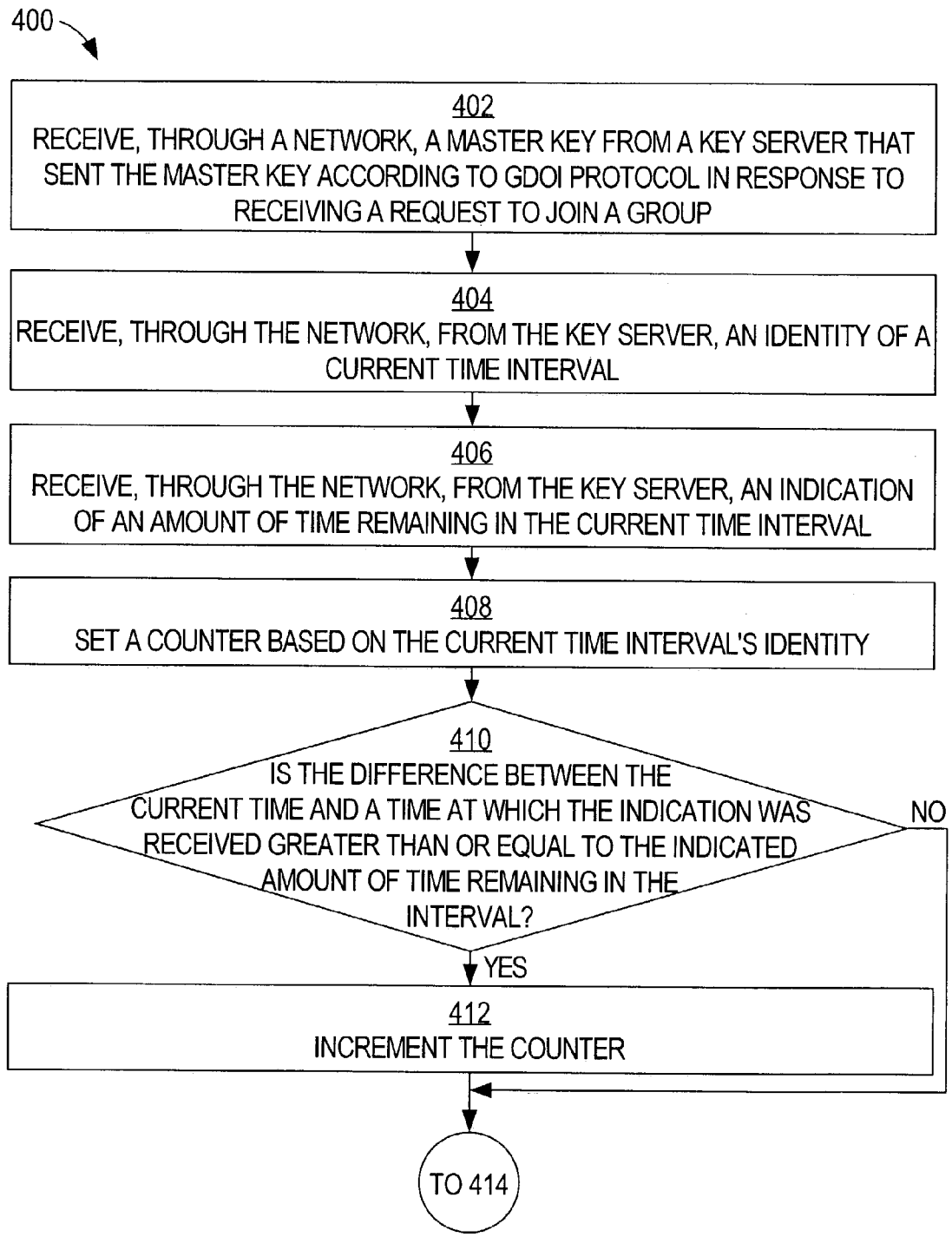
FIGS. 4A and 4B are flow diagrams that illustrate one embodiment of a method of verifying, with time-based and source address-based derived cryptographic keys, the timeliness of data contained in ESP packets.
Figure 4B:
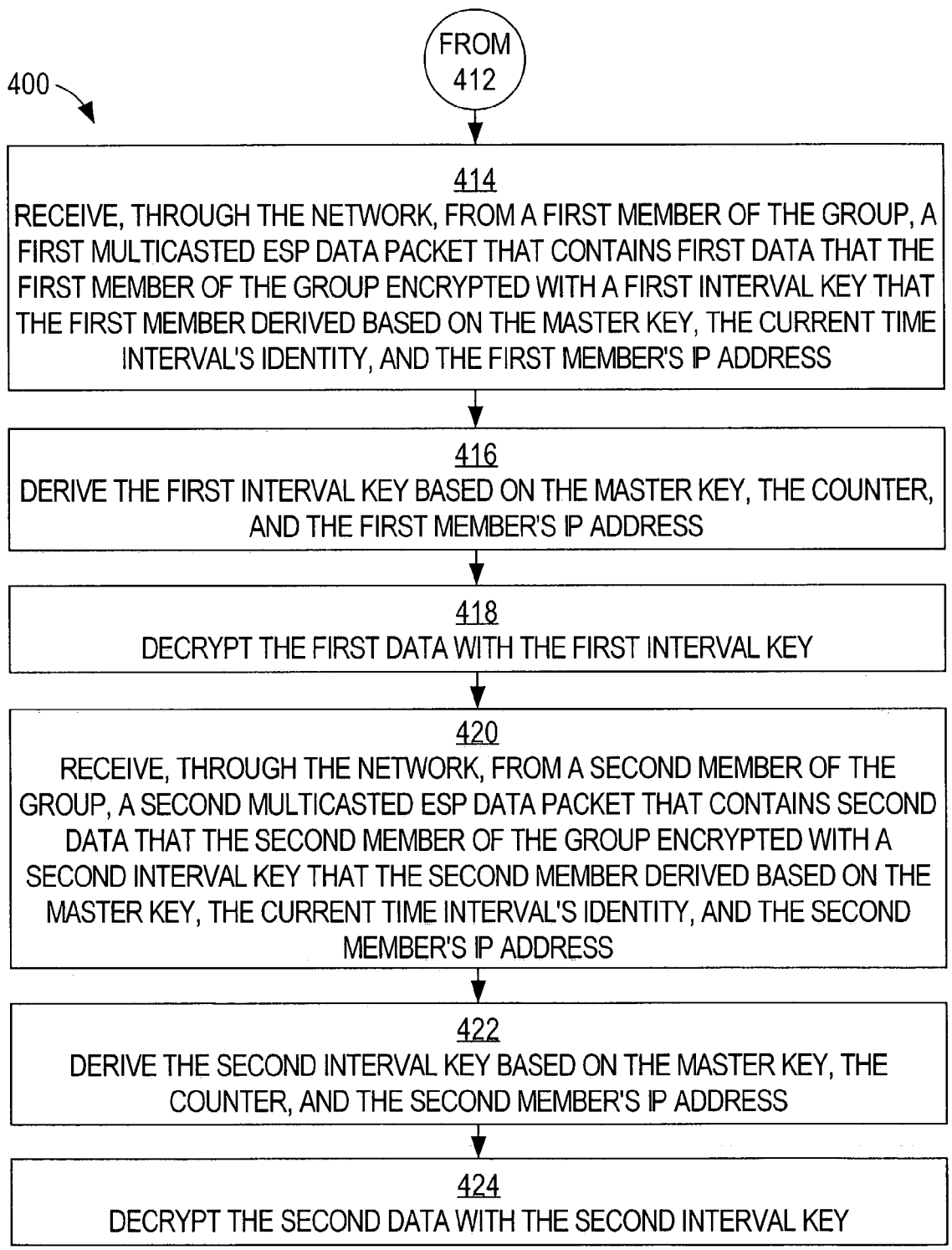

FIGS. 4A and 4B are flow diagrams that illustrate one embodiment of a method 400 of verifying, with time-based and source address-based derived cryptographic keys, the timeliness of data contained in ESP packets that are multicasted to a group. Such a method may be performed by any of many different devices, such as, for example, any of hosts 102A-102N described above.

In block 402, a master key is received, through a network, from a key server that sent the master key according to GDOI protocol in response to receiving a request to join a group.

In block 404, an identity of a current time interval, which is known to each member of the group, is received, through the network, from the key server.

In block 406, an indication of an amount of time remaining in the current time interval is received, through the network, from the key server.

In block 408, a counter is set based on the current time interval's identity. For example, if the current time interval's identity is "2", then the counter is set to "2".

In block 410, it is determined whether the difference between a current time and a time at which the indication was received is greater than or equal to the indicated amount of time remaining in the current time interval. If the difference is greater than or equal to the amount, then control passes to block 412. Otherwise, control passes to block 414.

In block 412, the counter is incremented. Thus, at the end of any given time interval, the counter is updated to reflect the next time interval's identity. Therefore, at any given time, the counter indicates the current time interval's identity.

In block 414, a first multicasted ESP packet is received, through the network, from a first member of the group. The first ESP packet contains first data that the first member of the group encrypted with a first interval key that the first member derived based on the master key, the current time interval's identity, and the first member's IP address. The first ESP packet may be contained in an IP packet. The first ESP packet does not contain a timestamp.

In block 416, the first interval key is derived based on the master key, the counter, and the first member's IP address. For example, the first interval key may derived by determining the value of a one-way function applied to a combination of the master key, the counter, and the first member's IP address. The first member's IP address may be obtained from the source address field of the IP packet that contained the first data. Deriving an interval key based on a source IP address makes it more difficult for a rogue host to perpetrate a successful attack. If the rogue host changes an IP packet's source IP address to the rogue host's own IP address, then, based on the rogue host's IP address, the IP packet's recipients will derive an incorrect interval key, which cannot be used to decrypt the encrypted data contained within the IP packet.

In block 418, the first data is decrypted with the first interval key.

In block 420, a second multicasted ESP packet is received, through the network, from a second member of the group. The second ESP packet contains second data that the second member of the group encrypted with a second interval key that the second member derived based on the master key, the current time interval's identity, and the second member's IP address. The second ESP packet may be contained in an IP packet. The second ESP packet does not contain a timestamp.

In block 422, the second interval key is derived based on the master key, the counter, and the second member's IP address. For example, the second interval key may derived by determining the value of the same one-way function applied to a combination of the master key, the counter, and the second member's IP address. The second member's IP address may be obtained from the source address field of the IP packet that contained the second data.

In block 424, the second data is decrypted with the second interval key. As a result of method 400, a group member host can verify the timeliness, or freshness, of data contained in ESP packets.

According to one embodiment, in addition to the master key, an ESP Security Association policy may be received from the key server. The ESP Security Association policy may specify the duration of the time intervals, and how long interval keys are valid. Also, the ESP Security Association policy may specify whether the sender host's IP address is to be used to derive the interval keys. Additionally, the ESP Security Association policy may specify and the identities of separate encryption and authentication algorithms. For example, an ESP Security Association policy may identify DES as the encryption algorithm, and Key-Hashing Message Authentication (HMAC) in conjunction with Secure Hash Algorithm (SHA), as is described in IETF RFC 2404, as the authentication algorithm. According to the separate specified encryption and authentication algorithms, separate encryption and authentication interval keys may be derived for each time interval. Data may be encrypted and decrypted according to an encryption interval key, and authenticated according to an authentication interval key.

4.0 Implementation Mechanisms—Hardware Overview

Figure 5:
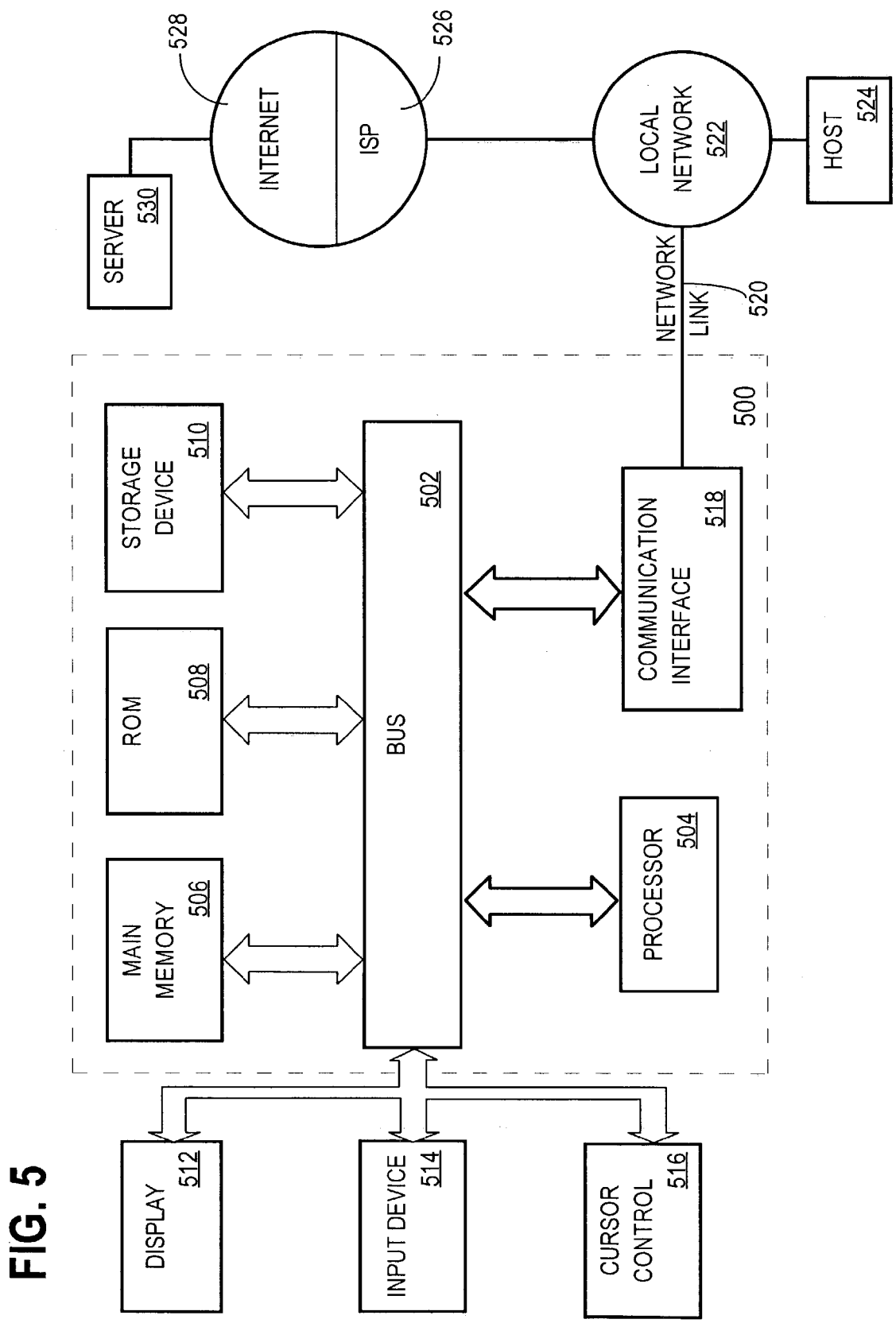
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for verifying data timeliness with time-based derived cryptographic keys. According to one embodiment of the invention, verifying data timeliness with time-based derived cryptographic keys is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for verifying data timeliness with time-based derived cryptographic keys as described herein.

The received code may be executed by processor 504 as it is received, and/or stored in storage device 510, or other non-volatile storage for later execution. In this manner, computer system 500 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, instead of deriving an interval key based on a time interval, a key could be derived based on previously derived key, such as a most recently derived key.

What is claimed is:

1. A computer-implemented method of verifying data timeliness with time-based derived cryptographic keys, the method comprising:
   receiving a master key;
   receiving an identity of a current time interval;
   wherein the master key and the identity of the current time interval are received from a key server;
   deriving a first interval key based on both the master key and a first time interval; and
   decrypting first data that was encrypted with the first interval key
   wherein the first time interval is determined based on a first time and the identity of the current time interval;
   during a first interval of time, encrypting, with the first interval key, all data that is to be communicated to a particular group of recipients during the first interval of time;
   deriving a second interval key based on both the master key and a second time that differs from the first time; and
   during a second interval of time that occurs after the first interval of time, encrypting, with the second interval key, all data that is to be communicated to the particular group of recipients during the second interval of time.

2. The method of claim 1, further comprising the computer-implemented steps of:
   receiving the first data from a first sender;
   receiving, from a second sender that differs from the first sender, second data that was encrypted with the first interval key, wherein the second data differs from the first data; and
   decrypting the second data with the first interval key.

3. The method of claim 1, wherein the first data does not contain a timestamp.

4. The method of claim 1, further comprising the computer-implemented step of:
   receiving a data packet that contains the first data;
   wherein the data packet comprises an Encapsulating Security Payload (ESP) packet.

5. The method of claim 1, wherein deriving the first interval key comprises determining a value of a one-way function applied to a combination of the master key and a value that is associated with the first time.

6. The method of claim 1, wherein deriving the first interval key comprises deriving the first interval key based on a source network address that is specified in a data packet that contains the first data.

7. The method of claim 1, wherein deriving the first interval key based on the first time comprises deriving the first interval key based on a time of day at which an interval of a specified duration of time started.

8. The method of claim 1, wherein deriving the first interval key based on the first time comprises deriving the first interval key based on a counter that indicates how many intervals of a specified duration of time have passed since a specified event occurred.

9. The method of claim 1, further comprising the computer-implemented step of:
   receiving an indication of an amount of time that remains in a time interval that corresponds to the first time.

10. The method of claim 1, further comprising the computer-implemented step of:
    preventing the first interval key from being used to decrypt data that is received after a specified period of time has passed since the first interval key was derived.

11. A computer-implemented method of verifying data timeliness with time-based derived cryptographic keys, the method comprising:
    receiving a master key from a key server;
    receiving, from the key server, an identity of a current time interval;
    receiving, from the key server, an indication of an amount of time remaining in the current time interval;
    setting a counter based on the identity of the current time interval;
    incrementing the counter upon determining that the difference between a current time and a time at which the indication was received is greater than or equal to the amount;
    deriving an interval key based on both the master key and the incremented counter;
    receiving, from a first sender that differs from the key server, first data that was encrypted with the interval key; and
    decrypting the first data with the interval key.

12. The method of claim 11, wherein deriving the interval key comprises determining a value of a one-way function applied to a combination of the master key and the counter.

13. The method of claim 11, further comprising the computer-implemented steps of:
    receiving, from a second sender that differs from both the first sender and the key server, second data that was encrypted with the interval key; and
    decrypting the second data with the interval key;
    wherein the second data differs from the first data.

14. A computer-implemented method of verifying data timeliness with time-based derived cryptographic keys, the method comprising:
    receiving, through a network, a master key from a key server that sent the master key according to the Group Domain of Interpretation (GDOI) protocol in response to receiving a request to join a group;
    receiving, through the network, from the key server, an identity of a current time interval that is known to each member of the group;
    receiving, through the network, from the key server, an indication of an amount of time remaining in the current time interval;
    setting a counter based on the identity of the current time interval;
    receiving, through the network, from a first member of the group, a multicasted Encapsulating Security Protocol (ESP) packet that contains first data that the first member encrypted with a first interval key that the first member derived based on the master key, the identity, and an Internet Protocol (IP) address of the first member;
    deriving the first interval key based on the master key, the counter, and the IP address of the first member; and
    decrypting the first data with the first interval key.

15. The method of claim 14, further comprising the computer-implemented steps of:
    receiving, through the network, from a second member of the group, a multicasted ESP packet that contains second data that that the second member encrypted with a second interval key that the second member derived based on the master key, the counter, and an IP address of the second member;
    deriving the second interval key based on the master key, the counter, and the IP address of the second member; and
    decrypting the second data with the second interval key.

16. A volatile or non-volatile computer-readable medium carrying one or more sequences of instructions for verifying data timeliness with time-based derived cryptographic keys, which instructions, when executed by one or more processors, cause the one or more processors to carry out the steps of:
- receiving a master key;
- receiving an identity of a current time interval;
- wherein the master key and the identity of the current time interval are received from a key server;
- deriving an interval key based on both the master key and a time interval; and
- decrypting data that was encrypted with the interval key;
- wherein the first time interval is determined based on a first time and the identity of the current time interval;
- during a first interval of time, encrypting, with the first interval key, all data that is to be communicated to a particular group of recipients during the first interval of time;
- deriving a second interval key based on both the master key and a second time that differs from the first time; and
- during a second interval of time that occurs after the first interval of time, encrypting, with the second interval key, all data that is to be communicated to the particular group of recipients during the second interval of time.

17. An apparatus for verifying data timeliness with time-based derived cryptographic keys, comprising:
- means for receiving a master key;
- means for receiving an identity of a current time interval;
- wherein the master key and the identity of the current time interval are received from a key server;
- means for deriving a first interval key based on both the master key and a first time interval; and
- means for decrypting first data that was encrypted with the first interval key;
- wherein the first time interval is determined based on a first time and the identity of the current time interval;
- means for encrypting, during a first interval of time, with the first interval key, all data that is to be communicated to a particular group of recipients during the first interval of time;
- means for deriving a second interval key based on both the master key and a second time that differs from the first time; and
- means for encrypting, during a second interval of time that occurs after the first interval of time, with the second interval key, all data that is to be communicated to the particular group of recipients during the second interval of time.

18. An apparatus for verifying data timeliness with time-based derived cryptographic keys, comprising:
- a network interface that is coupled to a data network for receiving one or more packet flows therefrom;
- a processor; and
- one or more stored sequences of instructions which, when executed by the processor, cause the processor to carry out the steps of:
  - receiving a master key;
  - receiving an identity of a current time interval;
  - wherein the master key and the identity of the current time interval are received from a key server;
  - deriving a first interval key based on both the master key and a first time interval; and
  - decrypting first data that was encrypted with the first interval key;
  - wherein the first time interval is determined based on a first time and the identity of the current time interval;
  - during a first interval of time, encrypting, with the first interval key, all data that is to be communicated to a particular group of recipients during the first interval of time;
  - deriving a second interval key based on both the master key and a second time that differs from the first time; and
  - during a second interval of time that occurs after the first interval of time, encrypting, with the second interval key, all data that is to be communicated to the particular group of recipients during the second interval of time.

19. The apparatus of claim 18, wherein the one or more stored sequences of instructions further comprise:
- instructions for receiving the first data from a first sender;
- instructions for receiving, from a second sender that differs from the first sender, second data that was encrypted with the first interval key, wherein the second data differs from the first data; and
- instructions for decrypting the second data with the first interval key.

20. The apparatus of claim 18, wherein the first data does not contain a timestamp.

21. The apparatus of claim 18, wherein the one or more stored sequences of instructions further comprise:
- instructions for receiving a data packet that contains the first data;
- wherein the data packet comprises an Encapsulating Security Payload (ESP) packet.

22. The apparatus of claim 18, wherein the one or more stored sequences of instructions further comprise instructions for determining a value of a one-way function applied to a combination of the master key and a value that is associated with the first time.

23. The apparatus of claim 18, wherein the one or more stored sequences of instructions further comprise instructions for deriving the first interval key based on a source network address that is specified in a data packet that contains the first data.

24. The apparatus of claim 18, wherein the one or more stored sequences of instructions further comprise instructions for deriving the first interval key based on a time of day at which an interval of a specified duration of time started.

25. The apparatus of claim 18, wherein the one or more stored sequences of instructions further comprise instructions for deriving the first interval key based on a counter that indicates how many intervals of a specified duration of time have passed since a specified event occurred.

26. The apparatus of claim 18, wherein the one or more stored sequences of instructions further comprise:
- instructions for receiving an indication of an amount of time that remains in a time interval that corresponds to the first time.

27. The apparatus of claim 18, wherein the one or more stored sequences of instructions further comprise:
- instructions for preventing the first interval key from being used to decrypt data that is received after a specified period of time has passed since the first interval key was derived.

28. The apparatus of claim 17, further comprising:
- means for deriving a second interval key based on both the master key and a second time that differs from the first time, wherein the second interval key differs from the first interval key; and
- means for decrypting second data that was encrypted with the second interval key.

* * * * *